United States Patent
Pecoraro et al.

[11] Patent Number: 5,795,363
[45] Date of Patent: Aug. 18, 1998

[54] REDUCTION OF SOLID DEFECTS IN GLASS DUE TO REFRACTORY CORROSION IN A FLOAT GLASS OPERATION

[75] Inventors: George A. Pecoraro, Lower Burrell; Yih-Wan Tsai, Pittsburg, both of Pa.

[73] Assignee: PPG Industries, Inc., Pittsburgh, Pa.

[21] Appl. No.: 758,139

[22] Filed: Nov. 25, 1996

[51] Int. Cl.$^6$ ................................................ C03B 5/16
[52] U.S. Cl. ...................... 65/134.4; 65/134.6; 65/157; 65/346
[58] Field of Search .................. 65/27, 134.4, 134.6, 65/157, 346

[56] References Cited

U.S. PATENT DOCUMENTS

| | | | |
|---|---|---|---|
| 3,083,551 | 4/1963 | Pilkington | 65/32 |
| 3,238,030 | 3/1966 | O'Connell et al. | 65/27 |
| 3,240,581 | 3/1966 | O'Connell et al. | 65/27 |
| 3,353,941 | 11/1967 | Hanks et al. | 65/134.4 X |
| 3,592,622 | 7/1971 | Shepherd | 65/135 |
| 3,734,701 | 5/1973 | Pecoraro et al. | 65/99.4 X |
| 3,811,854 | 5/1974 | Pecoraro | 65/27 |
| 3,837,832 | 9/1974 | Pecoraaro et al. | 65/182 |
| 4,599,100 | 7/1986 | Demarest, Jr. | 65/134.4 |
| 4,911,744 | 3/1990 | Petersson et al. | 65/134.4 |
| 4,973,346 | 11/1990 | Kobayashi | 65/136.1 X |
| 5,628,809 | 5/1997 | Kobayashi | 65/134.4 |

FOREIGN PATENT DOCUMENTS

| | | |
|---|---|---|
| 851103 | 9/1970 | Canada . |
| 1035415 | 6/1966 | United Kingdom . |
| 1067006 | 4/1967 | United Kingdom . |

*Primary Examiner*—Stanley S. Silverman
*Assistant Examiner*—Sean Vincent
*Attorney, Agent, or Firm*—Andrew C. Siminerio

[57] ABSTRACT

The present invention provides an apparatus and method for reducing the occurrences of solid defects in float glass due to corrosion of refractory in a glass melting and refining furnace. In making flat glass by the float process, batch materials are fed into a melting and refining furnace and heated to form molten glass. The molten glass passes through the melting section and into a refining section of the furnace where the glass is gradually cooled and conditioned prior to delivering the glass to a forming chamber where the molten glass is floated upon molten metal and formed into a continuous sheet of glass. During the melting operation, alkali vapors from the molten glass accumulate within a downstream portion of the melting section. These vapors attack and corrode those portions of the melting section of the furnace which are constructed from silica refractory. The products of the corrosion are deposited in the molten glass resulting in solid defects. In the present invention, a nonreactive gas is directed into the downstream portion of the melting section at a temperature no greater than that of the molten glass within the melting section and at a gas volume sufficient to reduce the amount of alkali vapors in the downstream portion of the melting section. As a result, the corrosion of the silica refractory is reduced and the total occurrences of solid defects in the glass due to refractory corrosion is reduced. In one embodiment of the invention, the gas is the combustion products from burners that are positioned in the downstream portion of the melting section of the furnace.

27 Claims, 2 Drawing Sheets

REDUCTION OF SOLID DEFECTS IN GLASS DUE TO REFRACTORY CORROSION IN A FLOAT GLASS OPERATION

BACKGROUND OF THE INVENTION

1. Field of the Invention

This invention relates to the production of high quality flat glass by the float process and, in particular, to the reduction of solid defects in the glass product of such process due to refractory vapor corrosion.

2. Technical Considerations

The production of high quality flat glass by the float process such as that disclosed U.S. Pat. No. 3,083,551 is practiced on a large scale. Typically, the float process includes a glass melting and refining furnace having a melting section for receiving raw batch materials and melting the batch materials to form molten glass and a refining section for gradually cooling and conditioning the molten glass to prepare it for forming. The conditioned glass is delivered from the refining section to a forming chamber which forms a continuous sheet of glass by floating the molten glass upon molten metal, applying forces and cooling it. The continuous sheet of glass is then withdrawn from the forming chamber, controllably cooled and cut into glass blanks.

In the art it is known that in order to obtain a commercially acceptable product, care must be exercised to eliminate to the greatest extent possible the common kinds of defects that occur in such glass, such as gaseous inclusions and solid defects, e.g. ream knot and stones. Moreover, the measures taken towards eliminating the occurrence of such defects must be such that they produce no substantial deleterious effect upon the distortion quality of the product glass. For an operation to be commercially successful, it is generally necessary to produce glass exhibiting a defect density on the order of no greater than 1 per one hundred square feet (9.23 square meters) of glass and preferably about 0.5 per one hundred square feet or lower.

In production of flat glass, it is known that the corrosion of silica refractory results in defects in the glass. In particular, the action of alkali vapors from the molten glass upon silica refractories lining selected walls and the roof structure of a melting and refining furnace corrode the silica refractory. The product of such corrosion is sodium silicate glass. This glassy material runs along the silica refractory surface and over other refractories used within the melting section of the furnace, e.g. the AZS (alumina-zirconia-silica) refractory or beta alumina refractory, dissolving this additional refractory. The sodium silicate glass is then deposited in the molten glass, resulting in ream knots and other solid defects.

References such as British Patent Nos. 1,067,006 and 1,035,415 and U.S. Pat. Nos. 3,240,581 and 3,238,030 deal with the reduction of tridymite frost stone defects forming in the refiner portion of a furnace. These references teach supplying the furnace with a sodium sulfur compound and chemically reducing the atmosphere to convert the tridymite to a sodium silica glass which is then absorbed into the pores of the refractory. Canadian Patent No. 851,103 discloses reconstruction of a furnace roof so that a constant bleeding of gas through the pores of the silica refractory may serve to protect the refractory from attack by the alkali vapors. U.S. Pat. No. 3,811,853 discloses mechanically dislodging tridymite particles from the silica refractory roof using hot gases. U.S. Pat. No. 3,837,832 discloses the use of burners in the refiner portion of the furnace to direct hot gas into the refiner headspace to minimize alkali vapor contact with the silica refractory.

It would be useful to have a system which reduces solid defects in float glass attributable to the operating conditions in the melting section of a float glass melting and refining furnace as well as reduce the rate of alkali vapor attack of the melting section refractories to prolong the life of the furnace.

SUMMARY OF THE INVENTION

The present invention provides an apparatus and method for reducing the occurrences of solid defects in float glass due to corrosion of refractory in a glass melting and refining furnace. In making flat glass by the float process, batch materials are fed into a melting and refining furnace and heated to form molten glass. The molten glass passes through the melting section and into a refining section of the furnace where the glass is gradually cooled and conditioned prior to delivering the glass to a forming chamber where the molten glass is floated upon molten metal and formed into a continuous sheet of glass. During the melting operation, alkali vapors from the molten glass accumulate within a downstream portion of the melting section. These vapors attack and corrode those portions of the melting section of the furnace which are constructed from silica refractory. The products of the corrosion are deposited in the molten glass, resulting in solid defects. In the present invention, a nonreactive gas is directed into the downstream portion of the melting section at a temperature no greater than that of the molten glass within the melting section and at a gas volume sufficient to reduce the amount of alkali vapors in the downstream portion of the melting section. As a result, the corrosion of the silica refractory is reduced and the total occurrences of solid defects in the glass due to refractory corrosion is reduced. In one embodiment of the invention, the gas is the combustion products from burners that are positioned in the downstream portion of the melting section of the furnace.

DETAILED DESCRIPTION OF THE INVENTION

Figure 1:
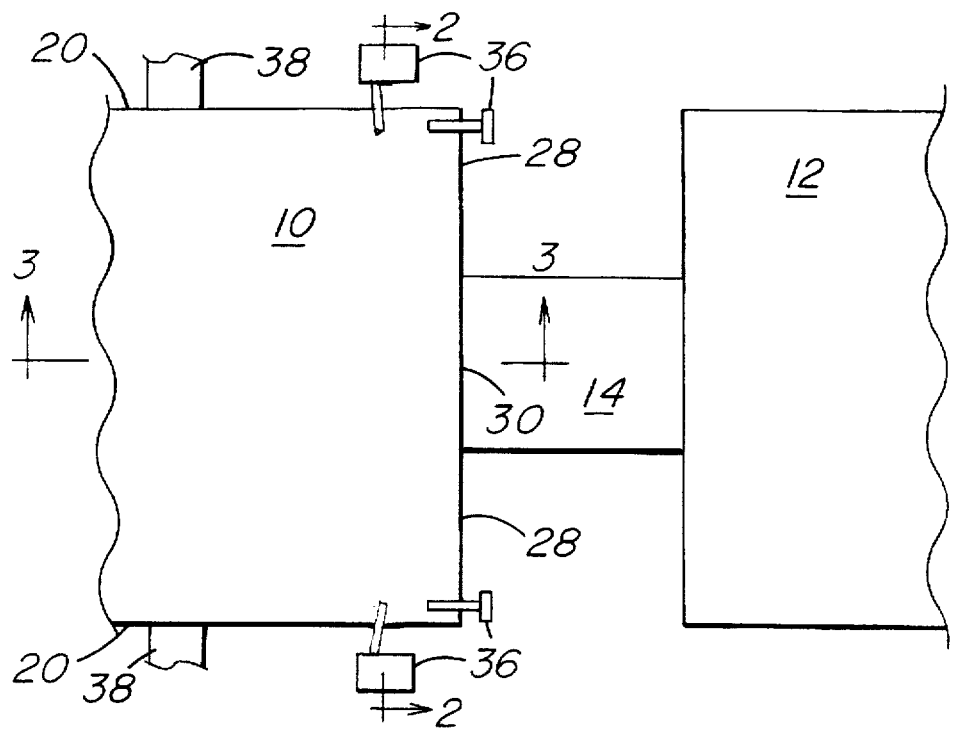
FIG. 1 is a schematic plan view of a conventional glass melting furnace incorporating the features of the present invention.

FIG. 1 is a schematic view of a conventional regenerative type of glass melting furnace of the type well known in the art for melting glass batch materials. The furnace includes a melting section 10 and a refiner section 12 interconnected by a waist section 14. To give an approximate scale of the operation, the melting and refining sections are on the order of 25 to 40 feet (7.6 to 12.2 meters) wide and the overall length of the melting furnace is on the order of about 150 to 400 feet (45.7 to 121.9 meters). The amount of glass produced per day is on the order of 150 to 700 tons (136 to 635 metric tons).

Figure 3:
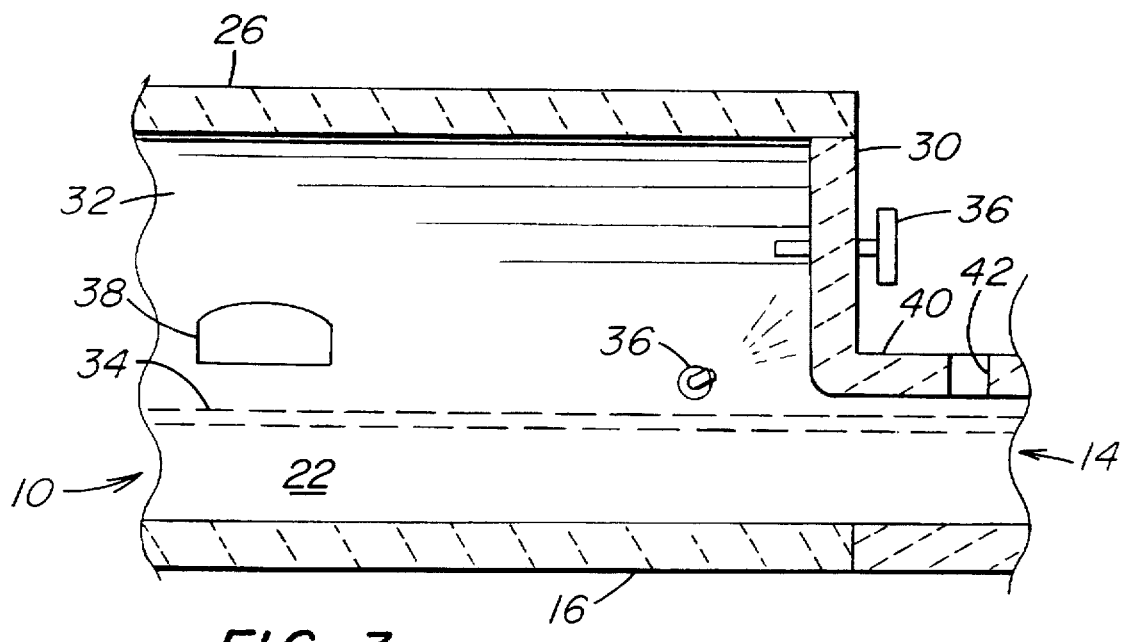
FIG. 3 is a section taken along line 3—3 of FIG. 1 illustrating the melting and waist sections of the furnace.
Figure 2:
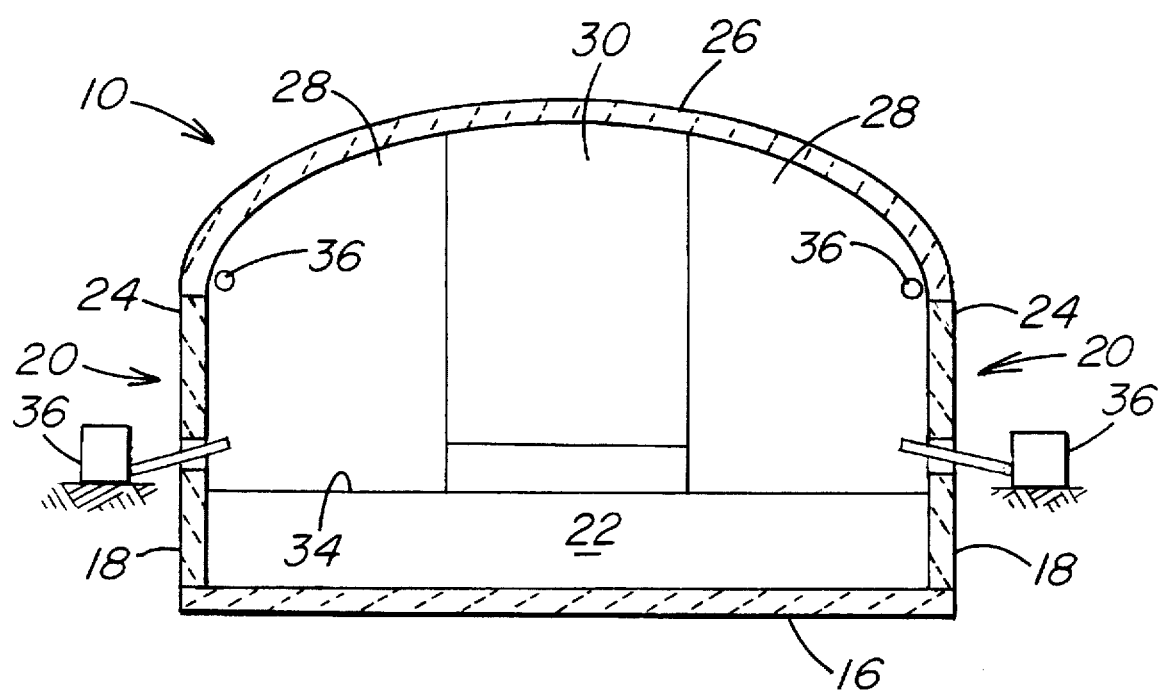
FIG. 2 is a section taken along line 2—2 of FIG. 1 illustrating a cross-section of the melting section of the furnace.

Referring to FIGS. 2 and 3, the melting section 10 is lined with refractory material. More particularly, bottom 16 and the basin wall portion 18 of the side walls 20 of melting section 10 are constructed from a refractory which contacts a bath of molten glass 22. This refractory is generally a fusion cast alumina-zirconia-silica block. The breast walls 24 of the side walls 20 are generally constructed from fusion cast beta alumina refractory block. The roof structure 26 and the waist wing walls 28 are generally constructed from silica refractory. A barrier or waist shadow wall 30 separates the melting section headspace 32, i.e. the area above the molten glass 22 within the melting section 10, from the rest of the furnace. In the particular embodiment of the invention illustrated in FIG. 1, the shadow wall 30 is generally aligned with the wing walls 28 at the downstream end of the melting section 10 and is preferably positioned a distance of about 2 to 12 inches (5.1 to 30.5 cm) from the surface 34 of the molten glass 22.

During the glass melting operation, alkali vapors accumulate within the headspace 32 of the downstream portion of the melting section 10. These alkali vapors corrode the silica refractories in this portion of the furnace forming molten sodium silicate glass. This glassy material runs along the silica refractory surface and over the AZS refractory forming the basin dissolving the AZS refractory. In addition, the molten sodium silicate glass will also run along the joint between the silica refractory waist wing walls 28 and the beta alumina refractory breast walls 24 dissolving the breast wall refractory. The molten sodium silicate glass, along with materials from the dissolved refractories, is then deposited in the molten glass, resulting in solid defects in the final glass product. Also, as the refractories corrode, alumina, zirconia and silica particles in the refractory block may become dislodged and fall into the molten glass. In addition, dripping of the sodium silicate glass from the roof of the furnace forms structures, referred to as silicicles, which may break off and fall into the molten glass causing additional defects.

The present invention uses one or more high volume gas inlets 36 introduced through openings in the side walls 20 and/or wing walls 28 to direct gas into the downstream portion of the melting section 10 and reduce the build-up of alkali vapors within the headspace 32 of the downstream portion of melting section 10. As used herein, the term "nonreactive" means that the gas will not react with the refractory within the melting section 10 in a manner that corrodes the refractory. In one particular embodiment of the invention, the inlets 36 are burners that produce a jet of combustion products, i.e. exhaust gas resulting from the combustion of fuel, for example natural gas, with air. In general, it is preferred that the burners not produce a flame within the melting section 10 so as to avoid creation of any unwanted convective flow in the glass bath 22 due to radiation heating from such a flame. Such convective flows may tend to deprive the glass of the relatively high degree of internal homogeneity that it should possess to produce high quality glass. In addition, the heat provided by such a flame could accelerate the corrosive action of the alkali vapors on the silica refractory. However, as will be discussed later in more detail, there may be certain operation conditions during which the inlet gas may be used to selectively affect the glass temperature with the furnace. The inlets 36 may also be a pipe or blower arrangement to direct ambient or heated air into the melting section 10 of the furnace, as will be discussed later.

The gases delivered by the inlets 36 serve to pressurize the headspace 32 in the downstream portion of the melting section 10 between the furthest downstream port 38 and the waist section 14 of the furnace, dilute the concentration of the alkali vapors coming into contact with the silica refractory forming the breast walls 24, roof structure 26, waist wing walls 28 and waist shadow wall 30, and reduce the temperature of the refractory so as to impede the corrosive reaction along the silica refractory. In this manner, the corrosion of the exposed silica refractory is slowed and the amount of sodium silicate glass runnage and/or drippage into the molten glass 22, as well as deposits of, alumina, silica and zirconia particles, are greatly reduced and thus reducing the number of defects. As a secondary benefit, since the number of total solid defects is reduced, it is anticipated that the furnace may be run at higher temperatures in the batch melting section, which, in turn, may reduce the number of gaseous inclusions in the molten glass 22.

In accordance with the present invention, it is expected that in the process of making float glass at the rate of 350 to 750 tons (317 to 680 metric tons) per day with a melting section 10 approximately 25 to 35 feet (7.6 to 10.7 meters) wide, it would be necessary to supply purging gas at a total rate of about 15,000 to 135,000 standard cubic feet per hour (SCFH) (425 to 3826 standard cubic meters per hour (SCMH)), and preferably about 30,000 to 90,000 SCFH (850 to 2551 SCMH), depending on the particular furnace, its operating conditions, glass tonnage, and gas temperature. It is preferred that a plurality of inlets 36 be used and, if desired, the inlets 36 may be arranged to direct their output towards those portions of the melting section 10 suspected of excessive refractory attack.

The temperature of the gas introduced into the melting section 10 should be no greater than the surface temperature of the glass or the refractory walls and roof, and preferably less than either temperature, so as to reduce the temperature of the refractory and alkali vapors and impede the corrosive reaction. At the very least, the gas should be temperature neutral with respect to the operating environment within the downstream portion of the melting section 10 near the waist section 14. Depending on the furnace operating conditions, it is expected that the maximum temperature of the gas should be about 2800° F. (1538° C.). Ambient air may also be used as the purging gas, as will be discussed later in more detail. When using high temperature combustion products as the purging gas, controls should be used to monitor and regulate and, if desired, vary the gas temperature during the glass melting process. Although not limiting in the present invention, the controls may include instrumentation to control the fuel/air ratio of the burners, injecting additional cooler air into the melting section 10 or the burner exhaust stream, or other systems known in the art.

When using combustion products from burners as the purging gas, it is preferred that each burner use about 1700 to 2300 SCFH (48 to 65 SCMH) fuel and about 35,000 to 55,000 SCFH (992 to 1559 SCMH) air and produce a theoretical flame temperature (i.e. the flame temperature that a particular fuel/air ratio will produce excluding any heat losses) in the range of about 1500° to 2800° F. (816° to 1538° C.). It should be appreciated that the actual volume of the combustion products depends on the flame temperature of the burner, with a higher flame temperature resulting in a greater actual volume of gas. Under the conditions discussed above, it is expected that the total equivalent volume of combustion products for a two burner is approximately 340,000 to 526,000 cubic feet per hour (CFH) (4818 to 7452 cubic meters per hour (CMH)).

With respect to the composition of the gas introduced through the inlets 36, it is expected that satisfactory results may be obtained with any gas that is substantially unreactive with the silica refractory. Thus, if a satisfactory supply of air, nitrogen or inert gas is available, such gas may be used. As discussed earlier, in one embodiment of the invention, the gas may be produced by the combustion of fuel, such as natural gas, propane, fuel oil, pulverized coal, etc., with a suitable quantity of excess air, such as 50 to 500 percent more than the stoichiometric amount required for combustion. The excess air is required to provide the required volume of gas needed to purge the headspace and to control the gas temperature.

In one particular embodiment of the invention, the inlets 36 included a pair of burners, one each positioned essentially flush along each side wall 20 approximately 12 inches (0.3 meters) above the glass surface 34 and approximately 3.5 feet (1.07 meters) back from the wing walls 28. The burners were oriented perpendicular to the side walls 20 and angled upward approximately 12 degrees toward the headspace 32. The furnace produced approximately 600 to 650 tons (545 to 590 metric tons) of glass per day and included a melting section 10 approximately 33 feet (10.1 meters) wide. Each burner was supplied with approximately 2200 SCFH (62 SCMH) of natural gas and 43,000 SCFH (1219 SCMH) of combustion air and produced a theoretical flame temperature of approximately 1730° F. (943° C.). The combustion of the natural gas and air was completed within the burner so that no flame was visible within the melting section 10. Under the operating conditions discussed above, the equivalent total volume of combustion products entering the downstream end of the melting section 10 from both burners in this particular embodiment is approximately 381,000 CFH (10,797 CMH). Each burner had an inside pipe diameter of 8 inches (20.32 cm) and it is estimated that the velocity of the combustion products as they exited the burners was in the range of approximately 151 feet per second (46 meters per second).

When using this arrangement, it was found that the gas was directed within the melting section 10 at a sufficiently high velocity that it dislodged crystobalite crystals that had formed a friable surface layer on the silica refractory and, in particular, along the roof structure 26. These crystals would fall into the molten glass 22 resulting in solid defects in the glass ribbon. In an effort to avoid direct impingement of the gas on this friable crystalline structure, the orientation of the burners 36 was modified. More specifically, one burner was directed straight across the molten glass 22, i.e. perpendicular to side wall 20, and the other burner was angled upstream, away from the wing wall 28 at an angle of about 87° from the side wall 20, so that the two gas streams would not directly impact each other. Both burners were supplied with approximately 1900 SCFH (54 SCMH) natural gas and approximately 40,000 SCFH (1134 SCMH) air and produced a theoretical flame temperature of about 2130° F. (1166° C.). The combustion products were directed horizontally into the melting section 10. Under these operating conditions, the total equivalent volume of the combustion products from both burners was approximately 417,000 CFH (11,817 CMH) and the gas was delivered from each burner at a velocity of about 166 feet per second (51 meters per second). This latter arrangement reduced total solid defects in the glass by greater than 50 percent.

In another embodiment of the invention, ambient temperature air was injected into the melting section 10 through inlets 36. The inlets 36 included a pair of pipes, each one positioned along side wall 20 and air was delivered into the melting section 10 at a rate of approximately 17,000 SCFH (482 SCMH) per side. Each inlet 36 was positioned essentially flush along a corresponding side wall 20 approximately 3 inches (7.7 cm) above the glass surface 34 and approximately 4 feet (1.22 m) back from the wing walls 28. The inlets 36 were angled downstream towards the wing walls 28, approximately 75° from the side wall 20, and upward approximately 5°. The furnace produced approximately 525 to 560 tons (476 to 508 metric tons) of glass per day and included a melting section 10 approximately 30 feet (9.1 m) wide. The inlet diameter was approximately 2.5 inches (6.35 cm), resulting in an approximate air velocity for each inlet 36 of about 139 feet per second (42.4 meters per second). Using this arrangement, there was over a 75 percent reduction in total solid defects in the glass. It is noted that this volume of air is significantly less than that discussed in the earlier embodiments of the invention which utilized high temperature combustion products, but it should be appreciated that by increasing the volume of ambient air, the cooling of the glass within the melting section 10 could adversely influence the final glass product. As discussed earlier, there should be a balance between the rate at which the gas is delivered into the melting section 10 and the desired dilution of the alkali vapors and cooling effects so as to avoid adversely effecting the desired temperature gradient in the molten glass bath 22.

It should be appreciated that inlets 36 may positioned at other locations to direct gas into the melting section 10, for example along the waist wing walls 28 and/or waist shadow wall 30. In one embodiment of the invention, inlets 36 were positioned in the wing walls 28, as illustrated in FIGS. 1 and 2, and oriented so as to direct the gas along the joint between the roof structure 26 and side wall 20. Such an arrangement is an example of locating and orienting the inlets in positions so as to direct gas at suspected high corrosion areas. In this particular embodiment, the gas was ambient air. It was found with this arrangement that the air cooled the refractory surface at the joint to too low a temperature so that the alkali vapors condensed and formed molten sodium salts on the refractory surfaces. This molten material corroded the underlying silica refractory as well as the beta alumina refractory of the breast wall 24. The molten salt runnage and corroded refractory was deposited in the molten glass 22 which increased the number of solid defects. However, it is believed that if a higher temperature gas was used or the inlets were positioned relative to the joint such that the air has a longer time to heat up within the melting section 10 before reaching the vicinity of the joint, the vapors would not have condensed on the refractory and this arrangement would have reduced the total number of solid defects in the glass. In addition, it is believed that injecting additional air into the melting section to freeze the molten salt may have also improved the end result.

As discussed earlier, although the temperature of the gas should not significantly alter the temperature gradients in the molten glass bath 22, it should be appreciated that the teachings of the present invention may be used to balance the heat profile of the glass bath 22, i.e. to adjust the temperature gradient of the glass in the bath 22 from the left side to the right side of the furnace to provide a desired temperature profile while reducing solid defects.

To this end, in one particular embodiment of the invention, the inlets 36 included a pair of burners, each positioned flush along one of the side walls 20 approximately 12 inches (30.5 cm) above the glass surface 34 and approximately 2 feet (0.61 meters) back from the wing walls 28. The burners were angled downstream towards the wing walls 28 at approximately 60 degrees from the side wall 22 and upward approximately 6 degrees. The first burner burned approximately 2200 SCFH (62 SCMH) of natural gas and 55,000 SCFH (1559 SCMH) of combustion air and produced a theoretical flame temperature of approximately 1830° F. (999° C.). The other burner burned approximately 2700 SCFH (77 SCMH) of natural gas and 40,000 SCFH (1133 SCMH) of combustion air to produce a theoretical flame temperature of approximately 2760° F. (1516° C.). The difference in temperature was provided to help balance the temperature profile of the glass across the width of the melting section 10. The total equivalent gas volume for both burners was approximately 516,000 CFH (14,618 CMH). The burners had an inside pipe diameter of 13 inches (33.02 cm) and it is estimated that the velocity of the exhaust gas as it exits the burners was in the range of approximately 76 to 80 feet per second (23.2 to 24.4 meters per second). This burner arrangement reduced total defect density by almost 45 percent.

In addition to temperature control, an additional benefit of purging the headspace 32 of the melting section 10 as disclosed herein is that excess air from the inlets or burners may provide an oxidizing atmosphere in the area of the melting section 10 between the last port 38 and waist section 14. Such an oxidizing atmosphere may be conducive to reducing bubble defect because maintaining an oxidizing condition avoids decomposition of $SO_3$ in the glass to $SO_2$ and $O_2$ which occurs under reducing conditions.

It should be appreciated that the velocity of the gas may impact the orientation of the burners within the melting section 10. More specifically, at higher velocities, there is a potential for disturbing any structures that may have formed on the surfaces of the refractory. As discussed earlier, this material may fall into the molten glass 22 and result in solid defects. By increasing the diameter of the inlet through which the gas enters the melting section 10 or by reorienting the inlets, this effect may be minimized.

It should be further appreciated that due to heat losses in the barrel of the burners, the theoretical flame temperature of a burner will be higher than the actual flame temperature. It is expected the actual temperature may be up to 300° F. (167° C.) cooler. As a result, if it is preferred that the actual flame temperature not exceed 2800° F. (1538° C.), the fuel/air ratio in the burners may be set to produce a theoretical flame temperature of up to about 3100° F. (1704° C.).

The combustion products or air escapes from the melting section 10 through ports 38. In addition, the combustion products or air may also be withdrawn through openings in the waist section 14. As a result, it should be appreciated that the present invention also protects the refractory in the waist section 14. More specifically, the roof 40 of the waist section 14 is generally a bonded alumina-silica or alumina-zirconia-silica refractory which is susceptible to alkali vapor degradation. The combustion products or air that flows into the waist section 14 and exits through openings 42 (shown only in FIG. 3) may reduce the refractory temperature and reduce the alkali vapor concentration, resulting in reduced degradation of the waist section refractory and a reduction in the total number of solid defects in the glass.

It should be recognized that a possible side effect of using excess air in the burners may be to increase the formation of $NO_x$ which is considered to be an objectionable air pollutant. To mitigate this effect and reduce $NO_x$ emissions, the fuel and air in burners may be burned at their stoichiometric proportion so that there is no excess oxygen and, therefore, no additional $NO_x$. However, this results in the combustion products being too hot. As a result, to avoid the excess $NO_x$ condition but still maintain the proper volumes and temperatures necessary to purge the headspace 32 and thus reduce solid defects in the glass, the firing operation of the burners may be changed to a stoichiometric or slightly fuel rich condition to eliminate all excess oxygen in the combustion products. As the combustion products pass through the burner barrel, nitrogen or some other inert gas may then be pumped into the burner outlet to mix with the combustion products to attain the desirable gas volume and temperature. Using this procedure, there is no excess oxygen in the combustion products contributing to the $NO_x$ formation. It should be appreciated that although the above-discussed embodiment of the invention combined the additional gas with the combustion products prior to it being directed into the melting section 10, it should be appreciated that the same effect may be attained by adding additional inlets (not shown) in the melting section 10 which deliver the nonreactive gas into the melting section 10 independent of the burners 36 to control the overall gas temperature within the melting section 10 and dilute the concentration of the alkali vapors within the melting section 10 in order to reduce defects in the glass.

It should be appreciated that a combination of both fuel burners and air inlets may be used in a manner as discussed herein to reduce the concentration of alkali vapors in the melting section 10 and reduce the corrosion of the silica refractory and reduce the total number of solid defects in the glass. In addition, although the embodiments discussed above generally have the inlets 36 placed symmetrically along opposing side walls 20 or wing walls 28, such placement is not required. The inlets 36 may be positioned at any location along the side walls 20, roof structure 26, wing walls 28 and/or suspended wall 30 required to reduce the corrosion of the silica refractory on the melting section 10 and thus reduce the occurrences of solid defects in the glass product.

The concept of providing a float glass production line with the features indicated above is particularly valuable in that it makes it possible to reduce the total number of solid defects in the glass product. It also slows the rate of refractory vapor corrosion attack which prolongs the life of the furnace.

The forms of the invention shown and described in this disclosure represent preferred embodiment and it is understood that various changes may be made without departing from the scope of the invention as defined in the following claims.

Therefore, we claim:

1. In an apparatus for making flat glass by the float process comprising a glass melting and refining furnace having a melting section for receiving raw batch materials and melting said batch materials to form molten glass, and a refining section for gradually cooling and conditioning said molten glass to prepare it for forming, means for delivering said molten glass from said refining section to a forming chamber comprising means for forming a continuous sheet of glass from said delivered molten glass by floating it upon molten metal, applying forces to it and cooling it, and means for withdrawing said continuous sheet of glass from said forming chamber, wherein portions of said melting section of said furnace are constructed from silica refractory and alkali vapors from said molten glass accumulate within a downstream portion of said melting section and corrodes said silica refractory, the improvement comprising:

means for directing a nonreactive gas into a downstream portion of said melting section at a temperature no greater than that of said molten glass within said melting section and at a volume sufficient to reduce the amount of alkali vapors in said downstream portion of said melting section, such that corrosion of said silica refractory is reduced.

2. The apparatus as in claim 1 wherein said directing means includes means to direct said gas at high corrosion areas within said downstream portion of said melting section.

3. The apparatus as in claim 1 wherein said melting section and refining section of said furnace are interconnected by a waist section constructed in part of silica refractory and further including means to withdrawn at least a portion of said gas from said melting section through said waist section to reduce the amount of alkali vapors in said waste section and reduce corrosion of said waist section silica refractory.

4. The apparatus as in claim 1 wherein said directing means directs gas into said melting section at a rate of about 15,000 to 135,000 SCFH.

5. The apparatus as in claim 1 wherein said directing means directs ambient air into said melting section.

6. The apparatus as in claim 1 wherein said directing means includes a first inlet positioned along a first side of said melting section and a second inlet positioned along a second side of said melting section, said inlets being positioned such that gas from said inlets is directed across said melting section.

7. The apparatus as in claim 1 wherein said melting section includes a wing wall at a downstream end of said melting section, and further including means to position said directing means at said wing wall to direct gas into said downstream portion of said melting section.

8. The apparatus as in claim 1 wherein said directing means includes at least one burner extending into said melting section to direct combustion products from said burner in a desired direction within said melting section.

9. The apparatus as in claim 8 wherein said burner produces a theoretical flame temperature of up to about 3100° F.

10. The apparatus as in claim 9 wherein said directing means directs gas into said melting section at a temperature of no greater than about 2800° F.

11. The apparatus as in claim 9 further including means to control said temperature of said gas.

12. The apparatus as in claim 11 wherein said burner includes means to burn fuel and air under stoichiometric conditions and further including means to inject a nonreactive gas into said combustion products from said burner.

13. The apparatus as in claim 11 wherein said directing means includes a first burner extending into said melting section along a first side of said melting section and a second burner extending into said melting section along a second side of said melting section.

14. The apparatus as in claim 13 wherein said first burner directs combustion products into said melting section at a temperature different from that of said second burner.

15. In a method for making flat glass by the float process, wherein batch materials are fed into a melting and refining furnace and heated to melt said batch materials to form molten glass, said molten glass passes along said melting section into a refining section for gradually cooling and conditioning of said molten glass to prepare it for forming, said molten glass is then delivered to a forming chamber where said molten glass is floated upon molten metal and formed into a continuous sheet of glass, and wherein portions of said melting section of said furnace are constructed from silica refractory and alkali vapors from said molten glass accumulate within a downstream portion of said melting section and corrodes said silica refractory, the improvement comprising:

directing a nonreactive gas into a downstream portion of said melting section at a temperature no greater than that of said molten glass within said melting section and at a volume sufficient to reduce the amount of alkali vapors in said downstream portion of said melting section and reduce corrosion of said silica refractory.

16. The method as in claim 15 wherein said directing step includes the step of directing said gas at high corrosion areas within said downstream portion of said melting section.

17. The method as in claim 15 wherein said directing step directs gas into said melting section at a rate of about 15,000 to 135,000 SCFH.

18. The method as in claim 15 wherein said directing step directs ambient temperature air into said melting section.

19. The method as in claim 15 wherein said directing step includes the step of positioning a first inlet along a first side of said melting section and a second inlet along a second side of said melting section and directing said gas from said inlets such that said gas is directed across said melting section.

20. The method as in claim 15 wherein said directing step further including the steps of burning fuel and air in at least one burner extending into said melting section to produce a theoretical flame temperature of up to about 3100° F. and directing combustion products from said burner in a desired direction within said melting section.

21. The method as in claim 20 wherein said directing step directs combustion products into said melting section at a temperature of no greater than about 2800° F.

22. The method as in claim 21 further including the step of controlling said temperature of said gas.

23. The method as in claim 21 further including the step of burning fuel and air in at least one burner to produce an combustion products and said directing step includes the step of directing said combustion products from said burner into said melting section.

24. The method as in claim 23 wherein said directing step includes the step of directing about 340,000 to 526,000 CFH of combustion product into said downstream portion of said melting section.

25. The method as in claim 23 further including the step of burning about 1700 to 2300 SCFH of fuel with about 35,000 to 45,000 SCFH of air at said burner.

26. The method as in claim 23 further including the step of burning said fuel and air under stoichiometric conditions and injecting additional nonreactive gas into said combustion products from said burner and directing said combustion products and additional nonreactive gas into said melting section.

27. The method as in claim 23 wherein said first burner directs gas into said melting section at a first temperature and said second burner directs gas into said melting section at a second temperature which is different from said first temperature.

* * * * *